(12) United States Patent
Benkert et al.

(10) Patent No.: US 10,521,611 B2
(45) Date of Patent: Dec. 31, 2019

(54) METHOD AND SYSTEM FOR EMERGENCY DATA DESTRUCTION

(71) Applicants: John E. Benkert, Fort Myers, FL (US); Tony E. Fessel, Fort Myers, FL (US)

(72) Inventors: John E. Benkert, Fort Myers, FL (US); Tony E. Fessel, Fort Myers, FL (US)

(73) Assignee: CIGENT TECHNOLOGY, INC., Fort Myers, FL (US)

( * ) Notice: Subject to any disclaimer, the term of this patent is extended or adjusted under 35 U.S.C. 154(b) by 0 days.

(21) Appl. No.: 16/014,569

(22) Filed: Jun. 21, 2018

(65) Prior Publication Data

US 2018/0373893 A1    Dec. 27, 2018

Related U.S. Application Data

(60) Provisional application No. 62/523,085, filed on Jun. 21, 2017.

(51) Int. Cl.
*G06F 21/62* (2013.01)
*G06F 21/55* (2013.01)
*G06F 16/16* (2019.01)

(52) U.S. Cl.
CPC ........ *G06F 21/6281* (2013.01); *G06F 16/164* (2019.01); *G06F 21/554* (2013.01)

(58) Field of Classification Search
CPC . G06F 21/6281; G06F 17/3012; G06F 21/554
See application file for complete search history.

(56) References Cited

U.S. PATENT DOCUMENTS 6,507,911 B1    1/2003 Langford
6,751,635 B1 *  6/2004 Chen ................... G06F 11/1435
(Continued)

FOREIGN PATENT DOCUMENTS

KR    10-2012-0118267 A    10/2012
KR    10-2015-0077810 A     7/2015
KR       1020130166669    * 12/2015    ............. G06F 21/00

OTHER PUBLICATIONS

Notification of Transmittal of the International Search Report and the Written Opinion of the International Searching Authority (Forms PCT/ISA/220, PCT/ISA/210 and PCT/ISA/237) dated Oct. 26, 2018, by the Korean Intellectual Property Office in corresponding International Application No. PCT/US2018/038568. (9 pages).

*Primary Examiner* — Harunur Rashid
(74) *Attorney, Agent, or Firm* — Buchanan Ingersoll & Rooney PC

(57) ABSTRACT

A method for emergency data destruction includes: identifying, by a data identification module, one or more data files for emergency destruction stored in one or more data storage devices; identifying, by the data identification module, at least one file system utilized by the one or more data storage devices; overwriting, by a data generation module, a header of each of the one or more data files, wherein the header of each of the one or more data files is identified based on the at least one file system; truncating, by a data modification module, a file size of each of the one or more data files; and deleting, by a data destruction module, each of the one or more data files, wherein the overwriting and truncating steps are performed prior to deletion of each of the one or more data files.

16 Claims, 6 Drawing Sheets

(56) References Cited

U.S. PATENT DOCUMENTS

2008/0177811 A1      7/2008  Cannon et al.
2011/0219049 A1*     9/2011  Zaitsev ................ G06F 3/0623
                                                           707/822
2013/0007062 A1*     1/2013  Dutta .................... G06F 16/215
                                                           707/792

* cited by examiner

| Emergency Deletion Priority | Data File Location |
|---|---|
| High | C:\Users\Jefferson\My Documents |
| High | C:\Program Files |
| Medium | C:\Program Files (x86) |
| Medium | C:\Users\Jefferson\My Pictures |
| Low | C:\Users\Jefferson\Downloads |
| Low | C:\Games |
| Low | C:\Users\Jefferson\My Music |
| Low | C:\Temp |

METHOD AND SYSTEM FOR EMERGENCY DATA DESTRUCTION

FIELD

The present disclosure relates to the emergency destruction of data from computing storage devices, specifically the targeted destruction of data used in data recovery prior to full deletion of data files.

BACKGROUND

Users of computing devices often require the deletion of data for a variety of reasons, such as to remove old, unwanted data, to prepare a storage device for gifting or sale, etc. Traditionally, typical methods for the erasure of data in a computing storage device focus on maximizing throughput while overwriting all storage locations. In cases where the storage device has a large maximum capacity, this can be a long, time consuming process. In such cases, interruption of the process can result in the data that is being destroyed to remain recoverable.

In emergency situations, time may be of the essence with respect to deletion of data. In the cases where the erasure process may be time consuming, the ability for a nefarious party to be able to recover data if interrupting the process may be detrimental to the owner of the data. Thus, there is a need for a technological solution to improve the speed and efficiency of the destruction of data from computing storage devices.

SUMMARY

The present disclosure provides a description of systems and methods for the emergency destruction of data. Data that is used in the recovery of deleted data is targeted first prior to deletion of the underlying data, to restrict the ability to recover the data. As a result, data may be unrecoverable even if the deletion process is not completed, which may be beneficial in emergency situations when the time able to be expended for the process is limited.

A method for emergency data destruction includes: identifying, by a data identification module of a computing device, one or more data files for emergency destruction stored in one or more data storage devices; identifying, by the data identification module of the computing device, at least one file system utilized by the one or more data storage devices; overwriting, by a data generation module of the computing device, a header of each of the one or more data files, wherein the header of each of the one or more data files is identified based on the at least one file system; truncating, by a data modification module of the computing device, a file size of each of the one or more data files; and deleting, by a data destruction module of the computing device, each of the one or more data files, wherein the overwriting and truncating steps are performed prior to deletion of each of the one or more data files.

A system for emergency data destruction includes: a data identification module of a computing device configured to identify one or more data files for emergency destruction stored in one or more data storage devices, and identify at least one file system utilized by the one or more data storage devices; a data generation module of the computing device configured to overwrite a header of each of the one or more data files, wherein the header of each of the one or more data files is identified based on the at least one file system; a data modification module of the computing device configured to truncate a file size of each of the one or more data files; and a data destruction module of the computing device configured to delete each of the one or more data files, wherein the overwriting and truncating steps are performed prior to deletion of each of the one or more data files.

BRIEF DESCRIPTION OF THE DRAWING FIGURES

The scope of the present disclosure is best understood from the following detailed description of exemplary embodiments when read in conjunction with the accompanying drawings. Included in the drawings are the following figures:

FIG. 4 is a diagram illustrating the use of a priority system for the emergency destruction of data in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Process for Emergency Data Destruction

Figure 1:
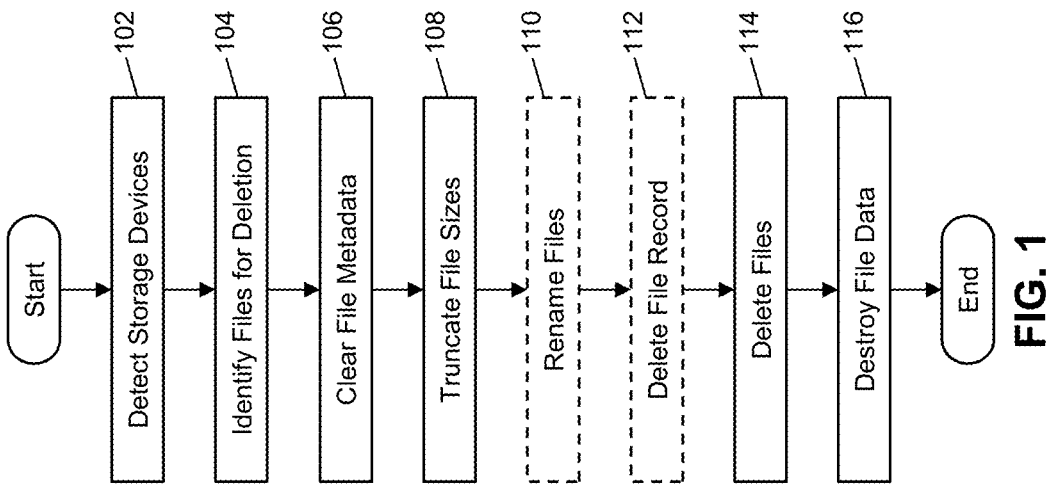
FIG. 1 is a flow diagram illustrating a high level process for the emergency destruction of data in accordance with exemplary embodiments.

FIG. 1 illustrates a process 100 for the emergency destruction of data in one or more data storage devices interfaced with a computing device to minimize the ability for recovery of data.

The process 100 may performed by a computing device, such as the computing device 200 illustrated in FIG. 2 and discussed in more detail below, that is specifically configured to perform the functions discussed herein. The process 100 may be used to destroy data files that are stored in one or more storage devices interfaced with or otherwise accessible by a computing device in a manner that reduces the ability for recovery of the data files targeted for destruction even in instances where the process 100 may be interrupted.

In step 102, the computing device may detect storage devices interfaced therewith that may store data files eligible for destruction. In some embodiments, the computing device may use commands and/or functions that are native to the operating system used to operate the computing device and/or computing devices through which the storage devices are interfaced. The computing device may detect the storage devices and, as part of the detection, may identify a file system utilized by each of the storage devices. In some cases, the computing device may also identify the location of a file record for each of the storage devices and/or generate an index of data files on each of the storage devices.

In step 104, the computing device may identify data files on the storage device(s) to be deleted using the process 100. In one embodiment, the process 100 may be initiated by a user of the computing device. In such an embodiment, the user may be prompted to select one or more data files for destruction using an interface of the computing device. In some cases, the computing device may be configured to delete all data files not necessary for the execution of the operating system of the computing device. In other embodiments, the computing device may identify a predetermined number of data files (e.g., or folders of data files) based on the operating system, such as default temporary file storage locations, personal folders, system settings, etc. In some instances, step 104 may include the identification of a priority ranking for each of the data files identified for deletion. For instance, the computing device may utilize one or more priority levels (e.g., low, medium, high) for data files for use in prioritizing the execution of one or more steps in the process 100 as part of the destruction process for each of the identified data files.

In step 106, the computing device may clear metadata from each of the identified data files. In some embodiments, the clearing of the metadata may include the deletion of a header of each of the identified data files, which may be included therein or stored in an alternative location, which may be based on the file system for the corresponding storage device. In other embodiments, metadata for data files in a storage device may be stored in a centralized or other predetermined location of that storage device, such as based on the associated file system, and may be cleared therefrom by the computing device.

In step 108, the computing device may truncate the file sizes for each of the identified data files. In some instances, file size information may be stored in the header of a data file, and may be truncated accordingly. In other instances, the file size information may be stored in the file record for the corresponding storage device. In such instances, the computing device may truncate the file size for each of the identified data files in the respective file record. In some embodiments, truncating of the file size may include updating the file size of the data file to be zero. In other embodiments, the file size may be set to a predetermined number (e.g., based on file system) that is different from the original file size for the respective data file.

In step 110, the computing device may rename each of the identified data files. In some embodiments, step 110 may be an optional step and may not be performed. In some cases, the user initiating the process 100 may select whether or not to include step 110 in the process 100. Renaming of the data files may include modification of both the file name and the file extension for the data file. In some cases, the file extension may be changed to an extension for a different file type. In other cases, the file extension may be changed to an arbitrary extension, including one that is not recognizable by the operating system. For instance, a file named "family.jpg" may be changed to "file.1."

In step 112, the computing device may delete or otherwise clear the file record for each of the storage devices from which data files are to be deleted. In some cases, the computing device may clear or delete only data in the file record that pertains to each of the identified files. In other cases, the computing device may only clear a file record if all data files on a given storage device are being destroyed. In some embodiments, step 112 may be an optional step and may not be performed. In some instances, the user initiating the process 100 may select whether or not to include step 112 in the process 100. In such instances, the user may also select to perform step 112 with respect to only a portion of the storage devices from which files are being destroyed. For instance, the user may select files for deletion where a majority reside on an external hard drive of the computing system, and may request that the file record for the external hard drive be cleared, but not the file record on the computing device's internal hard drive. In some cases, the ability to clear or delete from a file record may be based on the corresponding storage device's file system, and/or the native functions of the operating system of the computing device.

In cases where priorities may be assigned to data files for destruction, steps 106-112 may be performed on a priority basis. In one embodiment, the computing device may perform each of steps 106-112 for all of the data files of one priority level before performing steps 106-112 for the next priority level, and so on. In another embodiment, the computing device may perform a step (e.g., step 106) for each of the data files for one priority level, and then perform the same step for the data files of the next priority level, and so on, and wait to proceed to the next step in the process 100 until the step has been completed for all of the data files being destroyed. In some cases, the user may select how the steps of the process 100 are performed on the priority basis.

In step 114, the computing device may delete the identified data files. In an exemplary embodiment, the computing device may use native functions of the operating system to perform the deletion of the data files. By performing steps 106-112 prior to deletion of the data files, if the process 100 is interrupted, the ability for an entity to recover the data may be restricted if not made impossible due to the removal of metadata and other data necessary for use in data recovery. As such, the earlier steps are performed prior to the deletion of the data files in step 114 in the emergency destruction of data as, in most emergency situations, time is of the essence.

In step 116, the computing device may destroy the file data corresponding to the identified data files. For instance, in some file systems, deletion of data files in step 114 may not delete the underlying data from the storage device, but rather result in the file system flagging the corresponding data locations in the storage device as being available for future use. In such instances, step 116 may be used to ensure that the underlying data is also destroyed in an effort to make recovery impossible. In an exemplary embodiment, the computing device may generate a new data file in each of the storage devices from which data files were deleted. The computing device may generate the new data file, and may then incrementally increase the size of the data file using an arbitrary data pattern. The computing device may continue to increase the size of the data file until the size of the data file has filled all of the free space of the respective storage device. At this time, the computing device may delete the new data files, which may result in destruction of all of the underlying data for the deleted data files.

The methods and systems discussed herein enable a computing device to destroy data in an emergency situation. By removing metadata and other data used in file recovery situations first, the underlying data may be rendered unrecoverable even in instances where the complete destruction process may be interrupted. As a result, the methods discussed herein may have a higher success rate than traditional methods, even in cases where the full process 100 may not be completed. In addition, the performance of the steps prior to the deletion of the data files may be significantly faster than the overwriting processes used in traditional erasure methods, ensuring that the data is unrecoverable significantly faster than in traditional methods, further increasing efficiency, which may be paramount in emergency situations. Furthermore, the speed at which steps 106-112 may be performed in a computing device may be based on the number of data files being deleted, without regard for the size of the underlying data, ensuring that the data is made unrecoverable with greater speed and efficiency even in cases where the underlying data size is significant. For instance, the steps 106-112 may be performed just as quickly for destroying data used to recover 1,000 files that take up 500 megabytes of storage space as for destroying data used to recover 1,000 files that take up 50 terabytes of storage space.

Computing Device

Figure 2:
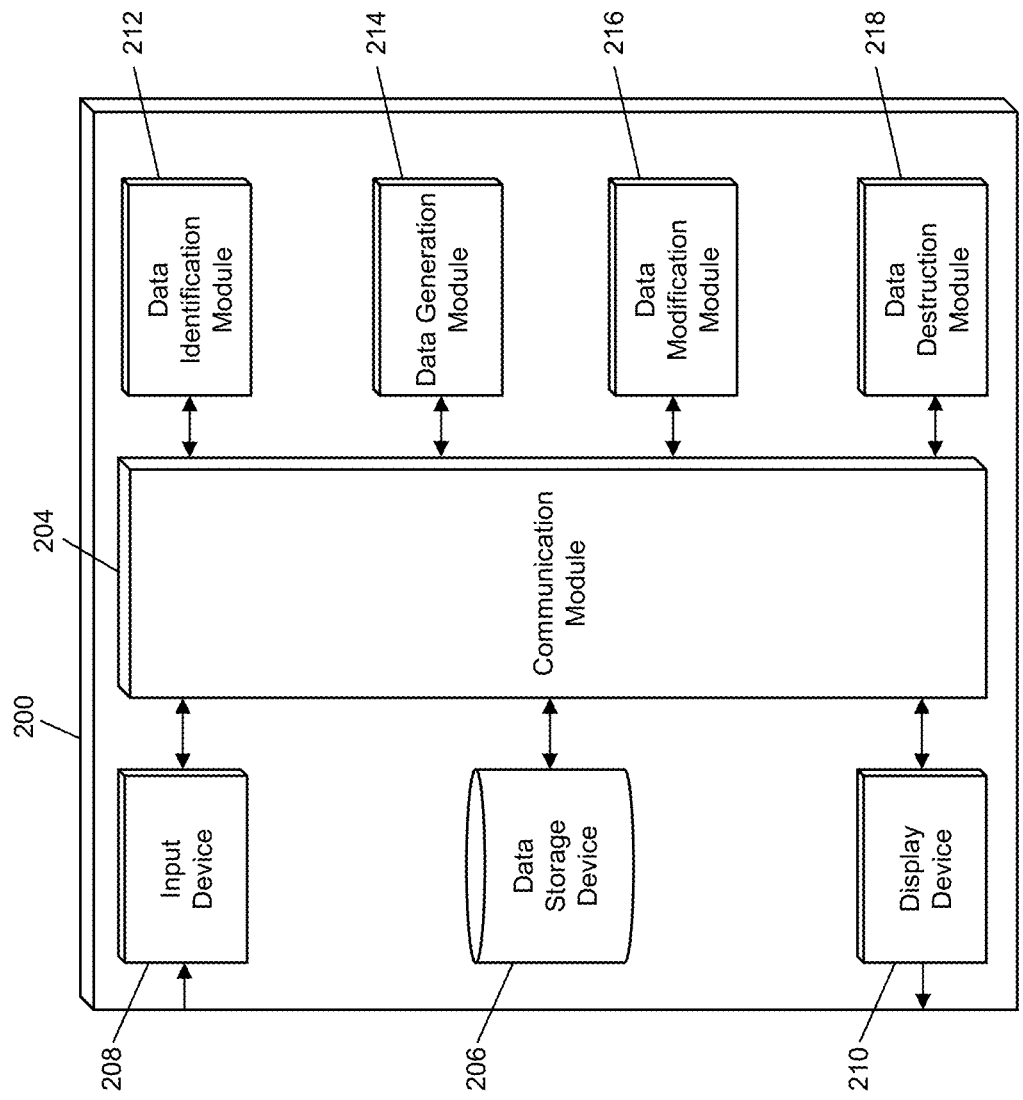
FIG. 2 is a block diagram illustrating a computing device for the performing of the process of FIG. 1 for emergency destruction of data in accordance with exemplary embodiments.

FIG. 2 illustrates an embodiment of a computing device 200 in the system 100. It will be apparent to persons having skill in the relevant art that the embodiment of the computing device 200 illustrated in FIG. 2 is provided as illustration only and may not be exhaustive to all possible configurations of the computing device 200 suitable for performing the functions as discussed herein. For example, the computer system 900 illustrated in FIG. 9 and discussed in more detail below may be a suitable configuration of the computing device 200.

The computing device 200 may include a communication module 204. The communication module 204 may be configured to transmit data between modules, engines, databases, memories, and other components of the computing device 200 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the computing device 200 and external components of the computing device 200, such as externally connected databases, display devices, input devices, etc. The computing device 200 may also include a processing device. The processing device may be configured to perform the functions of the computing device 200 discussed herein as will be apparent to persons having skill in the relevant art. In some embodiments, the processing device may include and/or be comprised of a plurality of engines and/or modules specially configured to perform one or more functions of the processing device, such as a data identification module 212, data generation module 214, data modification module 216, data destruction module 218, etc. As used herein, the term "module" may be software or hardware particularly programmed to receive an input, perform one or more processes using the input, and provides an output. The input, output, and processes performed by various modules will be apparent to one skilled in the art based upon the present disclosure.

The communication module 204 may also be configured to perform communications with one or more external computing systems or devices using suitable communication networks, methods, and protocols, such as radio frequency, local area networks, wireless area networks, cellular communication networks, Bluetooth, the Internet, etc. In some embodiments, the communication module 204 may be comprised of multiple modules, devices, or interfaces, such as different devices for transmitting and/or receiving data over different networks, such as a first device or module for transmitting/receiving data over a local area network and a second device or module for transmitting/receiving data via the Internet. The communication module 204 may transmit and receive electronically transmitted data signals, where data may be superimposed or otherwise encoded on the data signal and decoded, parsed, read, or otherwise obtained via receipt of the data signal by the computing device 200 or respective recipient. In some instances, the communication module 204 may include a parsing module for parsing of received data signals to obtain data superimposed thereon.

The computing device 200 may include a data storage device 206. The data storage device 206 may be configured to store data for use by the computing device 200 in performing the functions discussed herein, such as an operating system having one or more native commands used to perform the steps of the process 100, as discussed above. The data storage device 206 may be configured to store data using a file system and suitable data formatting methods and schema and may be any suitable type of memory, such as read-only memory, random access memory, etc. The data storage device 206 may include, for example, encryption keys and algorithms, communication protocols and standards, data formatting standards and protocols, program code for modules and application programs of the processing device, and other data that may be suitable for use by the computing device 200 in the performance of the functions disclosed herein as will be apparent to persons having skill in the relevant art. In some embodiments, the data storage device 206 may be comprised of or may otherwise include a relational database that utilizes structured query language for the storage, identification, modifying, updating, accessing, etc. of structured data sets stored therein.

In some embodiments, the data storage device 206 may be configured to store data files that are to be deleted via the process 100. In other embodiments, the computing device 200 may include additional data storage devices 206 from which data files may be deleted. In some cases, the computing device 200 may be configured to delete data files from data storage devices 206 that are external to the computing device 200, which may be interfaced therewith or may be interfaced with other computing devices or systems in communication with the computing device 200, such as via the communication module 204. In some cases, different data storage devices 206 accessible by the computing device 200 may utilize different file systems.

The computing device 200 may also include or be otherwise interfaced with one or more input devices 208. The input devices 208 may be internal to the computing device 200 or external to the computing device 200 and connected thereto via one or more connections (e.g., wired or wireless) for the transmission of data to and/or from. The input devices 208 may be configured to receive input from a user of the computing device 200, which may be provided to another module or engine of the computing device 200 (e.g., via the communication module 204) for processing accordingly. Input devices 208 may include any type of input device suitable for receiving input for the performing of the functions discussed herein, such as a keyboard, mouse, click wheel, scroll wheel, microphone, touch screen, track pad, camera, optical imager, etc. The input device 208 may be configured to, for example, receive input of instructions by a user for selection of one or more data files to be deleted or for deletion in a future emergency data destruction process (e.g., the process 100). The input device 208 may also be configured to receive an instruction from the user for initiating an emergency data destruction process.

The computing device 200 may also include or be otherwise interfaced with a display device 210. The display device 210 may be internal to the computing device 200 or external to the computing device 200 and connected thereto via one or more connections (e.g., wired or wireless) for the transmission of data to and/or from. The display device 210 may be configured to display data to a user of the computing device 200. The display device 210 may be any type of display suitable for displaying data as part of the functions discussed herein, such as a liquid crystal display, light emitting diode display, thin film transistor display, capacitive touch display, cathode ray tube display, light projection display, etc. In some instances, the computing device 200 may include multiple display devices 210. The display device 210 may be configured to, for example, display an interface to the user for the selection of data files for emergency destruction, the prioritization of data files for destruction, the initiation of the emergency data destruction process, etc. The display device 210 may also be configured to display notifications regarding an ongoing data destruction process, such as process of each of the steps 106-116 in the process 100, and a notification when the process 100 is completed.

The computing device 200 may also include a data identification module 212. The data identification module 212 may be configured to identify data for use in performing the functions of the computing device 200 as discussed herein. For instance, the data identification module 212 may be configured to identify all data storage devices 206 accessible by the computing device 200 and the data files stored therein that are eligible for destruction. The data identification module 212 may also be configured to identify the file system of each detected data storage device 206, as well as the location of each file record thereof. In an exemplary embodiment, the data identification module 212 may be configured to utilize native commands of an operating system in performing the functions associated therewith.

The computing device 200 may also include a data generation module 214. The data generation module 214 may be configured to generate data for use in performing the functions of the computing device 200 as discussed herein. The data generation module 214 may be configured to overwrite data, such as the overwriting of header information or metadata for existing data files. The data generation module 214 may also be configured to generate new data files and incrementally increase the file size of existing data files via an arbitrary data pattern. Any suitable type of arbitrary data pattern may be utilize by the data generation module 214, and may be used by the data generation module 214 to incrementally increase a newly generated data file until the available space in a target data storage device 206 is fully consumed. In an exemplary embodiment, the data generation module 214 may be configured to utilize native commands of an operating system in performing the functions associated therewith.

The computing device 200 may also include a data modification module 216. The data modification module 216 may be configured to modify data for performing the functions of the computing device 200 as discussed herein. The data modification module 216 may be configured to modify data files, file headers, file records, and other data as discussed herein. For instance, the data modification module 216 may be configured to modify file sizes of data files that are queued for destruction, such as part of step 108, as discussed above. The data modification module 216 may also be configured to rename data files, such as by modifying the file name and file extension for a data file to an arbitrary file name and file extension, respectively. In an exemplary embodiment, the data modification module 216 may be configured to utilize native commands of an operating system in performing the functions associated therewith.

The computing device 200 may also include a data destruction module 218. The data destruction module 218 may be configured to destroy data for performing the functions of the computing device 200 as discussed herein. The data destruction module 218 may be configured to delete data files, delete data included in file records, delete file records, delete metadata, delete file headers, or destroy other data as part of the data destruction processes discussed herein. In an exemplary embodiment, the data destruction module 218 may be configured to utilize native commands of an operating system in performing the functions associated therewith.

Destruction of Data Used in Data Recovery

Figure 3:
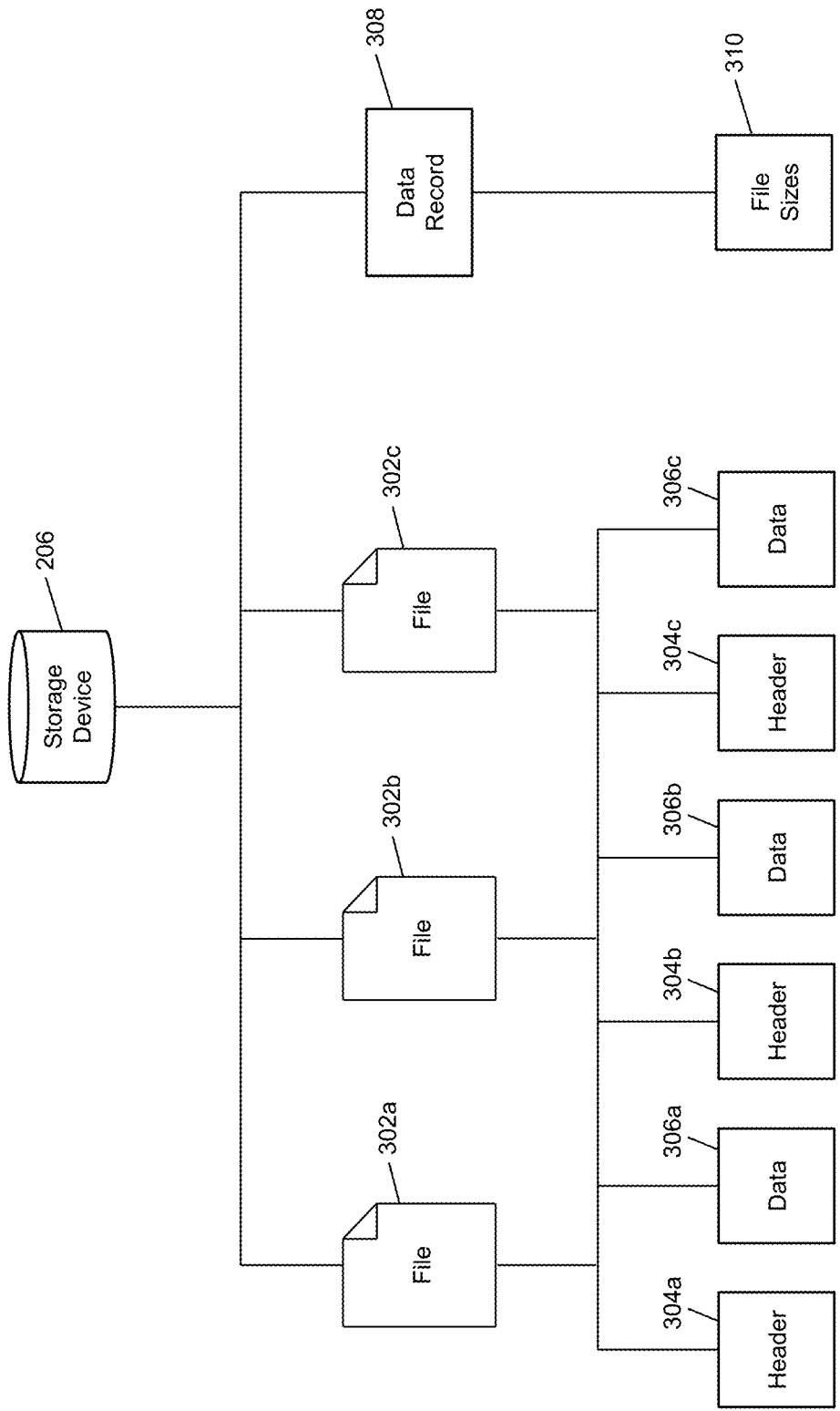
FIG. 3 is a block diagram illustrating data storage of a file system of a data storage device for emergency destruction thereof using the computing device of FIG. 2 in accordance with exemplary embodiments.

FIG. 3 illustrates data that may be included in a data storage device 206 included in or otherwise accessible by the computing device 200, which may include one or more data files for destruction using the process 100.

As illustrated, the data storage device 206 may be comprised of a plurality of data files 302 and a data record 308. Each of the data files 302 may include at least a header 304 and file data 306. The header 304 may include metadata about the respective data file 302 and its contents. The header 304 may be included at the beginning of the data file 302, at the end of the data file 302, or at another predefined location, which may be based on the file system of the data storage device 206, the operating system of the computing device 200, the file format of the data file 302, or other consideration. The header 304 may include, for instance, file size information, image format data, authoring information, date information, etc. The data 306 may be the underlying data corresponding to the data file 302.

As discussed above, during the process 100, the modules of the computing device 200 may be used to modify data stored in the header 304 for identified data files 302 and/or delete the header 304. For instance, in step 106, the data generation module 214 of the computing device 200 may be configured to overwrite the header 304 or data included therein to remove or otherwise obscure the metadata for targeted data files 302, or the data destruction module 218 may be configured to delete the header 304 entirely. In another example, in step 108, the data modification module 216 of the computing device 200 may be configured to truncate the file size for each of the data files 302 identified for destruction, which may be included in the header 304 of the respective data files 302.

The data record 308, also referred to herein as a file record, may be a record stored in the data storage device 206 that includes data regarding the data files 302 stored therein. Also referred to in the art as a data run list, file run list, etc. the data record 308 may include a listing of the data files 302 and data associated therewith, such as file sizes 310, underlying physical locations in the data storage device 206 for the corresponding data, etc. In some cases, the data included in a data record 308 and the location of the data record 308 may be based on the file system of the data storage device 206. As discussed above, the data record 308 may be modified or deleted as part of the process 100. For example, in step 108, the data modification module 216 of the computing device 200 may be configured to truncate the file sizes 310 for each of the data files 302 targeted for destruction. In another example, in step 112, the data destruction module 218 of the computing device 200 or the data modification module 216 may delete the data record 308 for a data storage device 206 or delete entries therein corresponding to data files 302 targeted for destruction, respectively.

Data Destruction Priority

FIG. 4 illustrates a table 400 that illustrates the assignment of priority levels to data file locations for destruction as part of the emergency destruction of data as discussed herein, such as in the process 100 discussed above.

As illustrated in the table 400, a priority level may be assigned to each data file or data file location that is selected for deletion as part of the emergency data destruction process. In the illustrated example, three priority levels are used: low, medium, and high. In this example, data files included in locations with a high priority will be processed first, followed by data files included in locations with a medium priority, and finishing with data files included in locations with a low priority. In some embodiments, each of the steps 106-110 may be performed first for data files having a high priority before the performance of steps 106-110 for data files having a medium priority and then again for the data files having a low priority. In other embodiments, each step (e.g., steps 106, 108, and 110) may first be performed for all of the data files going in order of priority. For instance, step 106 may be performed first for data files having high priority, then data files having medium priority, and lastly data files having low priority, before continuing on to step 108.

In some embodiments, the user may select the priority level for each of the data file locations and may identify the data file locations to be destroyed as part of the emergency data destruction process. In other embodiments, the computing device 200 may identify data file locations and associated priority levels based on predefined information. For instance, the computing device 200 may have default data file locations and associated priorities based on the operating system of the computing device 200 and/or the file systems of detected data storage devices 206. For example, folders used by the operating system for storage of user information (e.g., "C:\Users\Jefferson\My Documents" in the illustrated example) may be predefined by the computing device 200 for default inclusion in an emergency data destruction process.

Exemplary Method for Emergency Data Destruction

Figure 5:
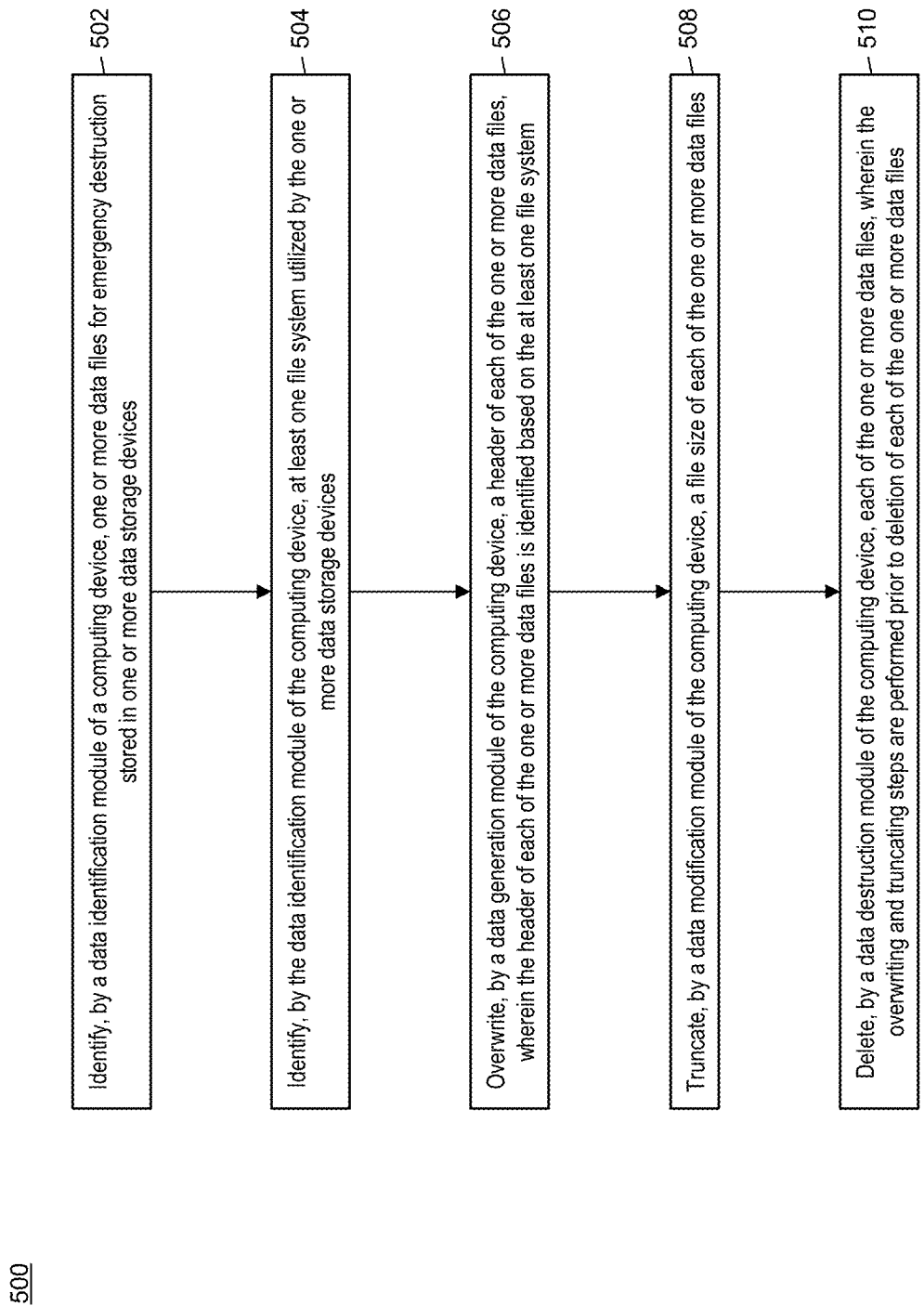
FIG. 5 is a flow chart illustrating an exemplary method for emergency data destruction in accordance with exemplary embodiments.

FIG. 5 illustrates a method 500 for the emergency destruction of data by a computing device that targets rendering data files unrecoverable prior to full deletion of the underlying data.

In step 502, one or more data files (e.g., data files 302) for emergency destruction may be identified by a data identification module (e.g., the data identification module 212) of a computing device (e.g., the computing device 200), wherein the one or more data files are stored in one or more data storage devices (e.g., data storage devices 206). In one embodiment, identifying the one or more data files may include receiving, by an input device (e.g., input device 208) interfaced with the computing device, user instructions selecting each of the one or more data files for destruction. In some embodiments, the one or more data storage devices may be one of: interfaced directly with the computing device or interfaced with a separate computing device.

In step 504, at least one file system utilized by the one or more storage devices may be identified by the data identification module of the computing device. In one embodiment, the method 500 may also include detecting, by the data identification module of the computing device, the one or more storage devices prior to identification of the at least one file system. In step 506, a header (e.g., header 302) of each of the one or more data files may be overwritten by a data generation module (e.g., the data generation module 214) of the computing device, wherein the header of each of the one or more data files is identified based on the at least one file system. In some embodiments, the header of each of the one or more data files may be overwritten using an arbitrary data pattern.

In step 508, a file size (e.g., file size 310) of each of the one or more data files may be truncated by a data modification module (e.g., the data modification module 216) may be truncated. In one embodiment, the file size of each of the one or more data files may be truncated to zero. In step 510, each of the one or more data files may be deleted by a data destruction module (e.g., the data destruction module 218) of the computing device, wherein the overwriting and truncating steps are performed prior to deletion of each of the one or more data files. In some embodiments, the method 500 may also include renaming, by the data modification module of the computing device, a file name of each of the one or more data files, wherein renaming the file name includes changing a file extension of the respective data file, and renaming is performed prior to deletion of the respective data file.

In one embodiment, the method 500 may further include deleting, by the data destruction module of the computing device, a file record (e.g., data record 308) associated with each of the one or more data storage devices, wherein the respective file record is identified based on the file system utilized by the corresponding data storage device. In some embodiments, the data identification module, data generation module, data modification module, and data destruction module may be configured to use native commands of an operating system of the computing device. In one embodiment, the method 500 may also include: generating, by the data generation module of the computing device, a new data file in each of the one or more data storage devices after deletion of the one or more data files; incrementally increasing, by the data generation module of the computing device, a file size of each new data file using an arbitrary data pattern until the corresponding data storage device has reached a maximum capacity; and deleting, by the data destruction module of the computing device, each new data file.

Computer System Architecture

Figure 6:
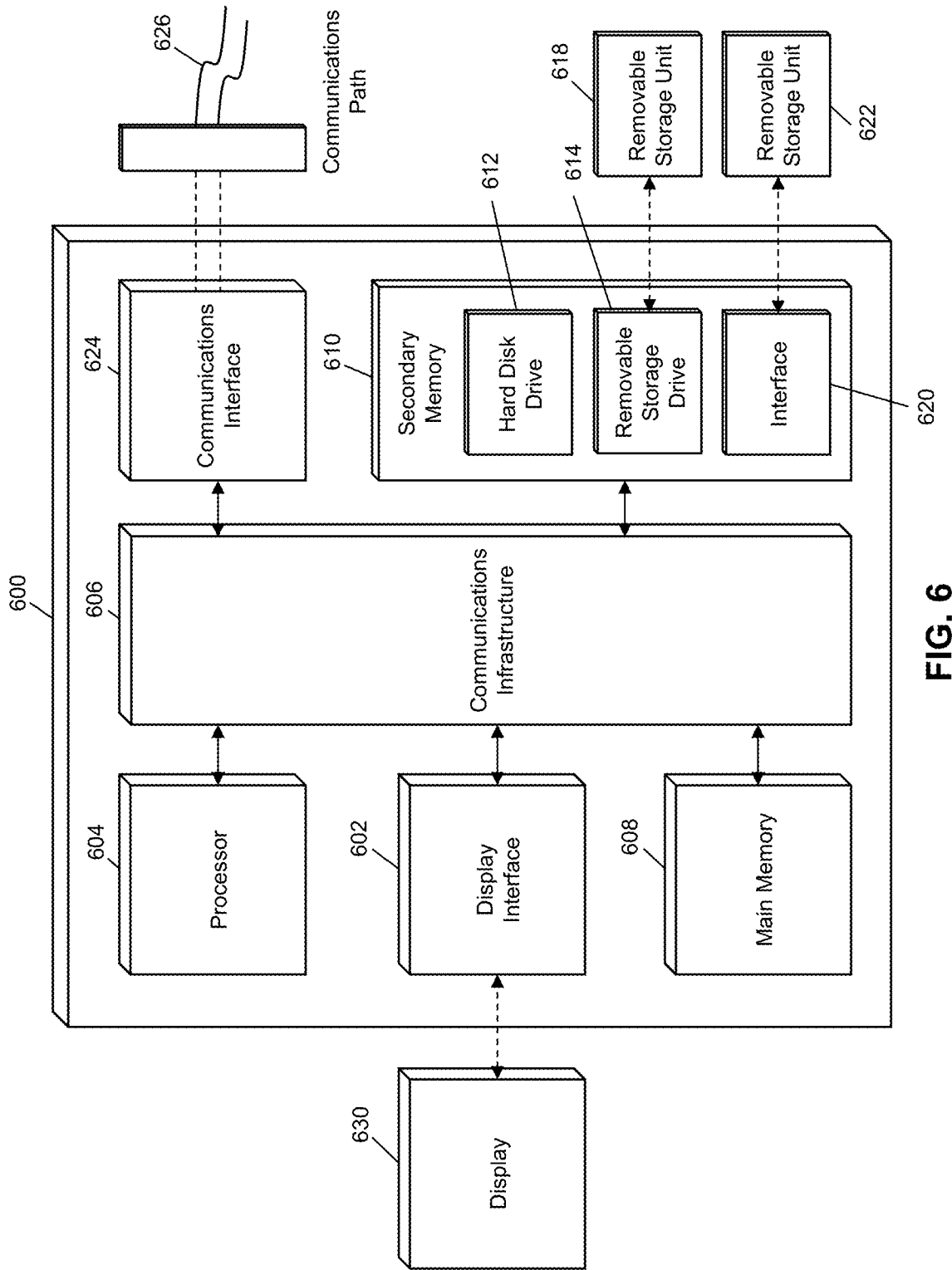
FIG. 6 is a block diagram illustrating a computer system architecture in accordance with exemplary embodiments.

FIG. 6 illustrates a computer system 600 in which embodiments of the present disclosure, or portions thereof, may be implemented as computer-readable code. For example, the computing device 200 of FIG. 2 may be implemented in the computer system 600 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 1 and 5.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 618, a removable storage unit 622, and a hard disk installed in hard disk drive 612.

Various embodiments of the present disclosure are described in terms of this example computer system 600. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 604 may be a special purpose or a general purpose processor device specifically configured to perform the functions discussed herein. The processor device 604 may be connected to a communications infrastructure 606, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 600 may also include a main memory 608 (e.g., random access memory, read-only memory, etc.), and may also include a secondary memory 610. The secondary memory 610 may include the hard disk drive 612 and a removable storage drive 614, such as a floppy disk drive, a magnetic tape drive, an optical disk drive, a flash memory, etc.

The removable storage drive 614 may read from and/or write to the removable storage unit 618 in a well-known manner. The removable storage unit 618 may include a removable storage media that may be read by and written to by the removable storage drive 614. For example, if the removable storage drive 614 is a floppy disk drive or universal serial bus port, the removable storage unit 618 may be a floppy disk or portable flash drive, respectively. In one embodiment, the removable storage unit 618 may be non-transitory computer readable recording media.

In some embodiments, the secondary memory 610 may include alternative means for allowing computer programs or other instructions to be loaded into the computer system 600, for example, the removable storage unit 622 and an interface 620. Examples of such means may include a program cartridge and cartridge interface (e.g., as found in video game systems), a removable memory chip (e.g., EEPROM, PROM, etc.) and associated socket, and other removable storage units 622 and interfaces 620 as will be apparent to persons having skill in the relevant art.

Data stored in the computer system 600 (e.g., in the main memory 608 and/or the secondary memory 610) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 600 may also include a communications interface 624. The communications interface 624 may be configured to allow software and data to be transferred between the computer system 600 and external devices. Exemplary communications interfaces 624 may include a modem, a network interface (e.g., an Ethernet card), a communications port, a PCMCIA slot and card, etc. Software and data transferred via the communications interface 624 may be in the form of signals, which may be electronic, electromagnetic, optical, or other signals as will be apparent to persons having skill in the relevant art. The signals may travel via a communications path 626, which may be configured to carry the signals and may be implemented using wire, cable, fiber optics, a phone line, a cellular phone link, a radio frequency link, etc.

The computer system 600 may further include a display interface 602. The display interface 602 may be configured to allow data to be transferred between the computer system 600 and external display 630. Exemplary display interfaces 602 may include high-definition multimedia interface (HDMI), digital visual interface (DVI), video graphics array (VGA), etc. The display 630 may be any suitable type of display for displaying data transmitted via the display interface 602 of the computer system 600, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 608 and secondary memory 610, which may be memory semiconductors (e.g., DRAMs, etc.). These computer program products may be means for providing software to the computer system 600. Computer programs (e.g., computer control logic) may be stored in the main memory 608 and/or the secondary memory 610. Computer programs may also be received via the communications interface 624. Such computer programs, when executed, may enable computer system 600 to implement the present methods as discussed herein. In particular, the computer programs, when executed, may enable processor device 604 to implement the methods illustrated by FIGS. 1 and 5, as discussed herein. Accordingly, such computer programs may represent controllers of the computer system 600. Where the present disclosure is implemented using software, the software may be stored in a computer program product and loaded into the computer system 600 using the removable storage drive 614, interface 620, and hard disk drive 612, or communications interface 624.

The processor device 604 may comprise one or more modules or engines configured to perform the functions of the computer system 600. Each of the modules or engines may be implemented using hardware and, in some instances, may also utilize software, such as corresponding to program code and/or programs stored in the main memory 608 or secondary memory 610. In such instances, program code may be compiled by the processor device 604 (e.g., by a compiling module or engine) prior to execution by the hardware of the computer system 600. For example, the program code may be source code written in a programming language that is translated into a lower level language, such as assembly language or machine code, for execution by the processor device 604 and/or any additional hardware components of the computer system 600. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 600 to perform the functions disclosed herein. It will be apparent to persons having skill in the relevant art that such processes result in the computer system 600 being a specially configured computer system 600 uniquely programmed to perform the functions discussed above.

Techniques consistent with the present disclosure provide, among other features, systems and methods for emergency data destruction. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for emergency data destruction, comprising:
identifying, by a processor of a computing device, one or more data files for emergency destruction stored in one or more data storage devices;
identifying, by the processor of the computing device, at least one file system utilized by the one or more data storage devices;
overwriting, by the processor of the computing device, a header of each of the one or more data files, wherein the header of each of the one or more data files is identified based on the at least one file system;
truncating, by the processor of the computing device, a file size of each of the one or more data files;
renaming, by the processor of the computing device, a file name of each of the one or more data files, where renaming the file name includes changing a file extension of the respective data file;
deleting, by the processor of the computing device, each of the one or more data files, wherein the overwriting, truncating, and renaming steps are performed prior to deletion of each of the one or more data files;
generating, generating, by the processor of the computing device, a new data file in each of the one or more data storage devices after deletion of the one or more data files;
incrementally increasing, by the processor of the computing device, a file size of each new data file using an arbitrary data pattern until the corresponding data storage device has reached a maximum capacity; and
deleting, by the processor of the computing device, each new data file.

2. The method of claim 1, wherein identifying the one or more data files includes receiving, by an input device interfaced with the computing device, user instructions selecting each of the one or more data files for destruction.

3. The method of claim 1, wherein the one or more data storage devices are one of: interfaced directly with the computing device or interfaced with a separate computing device.

4. The method of claim 1, further comprising:
detecting, by the processor of the computing device, the one or more storage devices prior to identification of the at least one file system.

5. The method of claim 1, wherein the header of each of the one or more data files is overwritten using an arbitrary data pattern.

6. The method of claim 1, wherein the file size of each of the one or more data files is truncated to zero.

7. The method of claim 1, further comprising:
deleting, by the processor of the computing device, a file record associated with each of the one or more data storage devices, wherein the respective file record is identified based on the file system utilized by the corresponding data storage device.

8. The method of claim 1, wherein the processor is configured to use native commands of an operating system of the computing device.

9. A system for emergency data destruction, comprising:
a data identification module of a computing device configured to
identify one or more data files for emergency destruction stored in one or more data storage devices, and
identify at least one file system utilized by the one or more data storage devices;
a data generation module of the computing device configured to overwrite a header of each of the one or more data files, wherein the header of each of the one or more data files is identified based on the at least one file system;
a data modification module of the computing device configured to
truncate a file size of each of the one or more data files, and
rename a file name of each of the one or more data files, where renaming includes changing a file extension of the respective data file; and
a data destruction module of the computing device configured to delete each of the one or more data files, wherein the overwriting, truncating, and renaming steps are performed prior to deletion of each of the one or more data files, wherein
the data generation module of the computing device is further configured to
generate a new data file in each of the one or more data storage devices after deletion of the one or more data files, and
incrementally increase a file size of each new data file using an arbitrary data pattern until the corresponding data storage device has reached a maximum capacity, and
the data destruction module of the computing device is further configured to delete each new data file.

10. The system of claim 9, wherein identifying the one or more data files includes receiving, by an input device interfaced with the computing device, user instructions selecting each of the one or more data files for destruction.

11. The system of claim 9, wherein the one or more data storage devices are one of: interfaced directly with the computing device or interfaced with a separate computing device.

12. The system of claim 9, wherein the data identification module of the computing device is further configured to detect the one or more storage devices prior to identification of the at least one file system.

13. The system of claim 9, wherein the header of each of the one or more data files is overwritten using an arbitrary data pattern.

14. The system of claim 9, wherein the file size of each of the one or more data files is truncated to zero.

15. The system of claim 9, wherein the data destruction module of the computing device is further configured to delete a file record associated with each of the one or more data storage devices, wherein the respective file record is identified based on the file system utilized by the corresponding data storage device.

16. The system of claim 9, wherein the data identification module, data generation module, data modification module, and data destruction module are configured to use native commands of an operating system of the computing device.

\* \* \* \* \*